June 8, 1954
J. J. SCHUERMANN
2,680,322
FISHING BOB
Filed Aug. 6, 1952
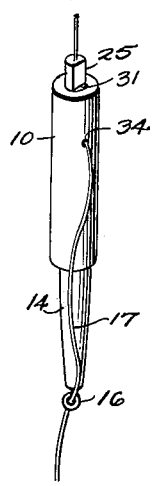
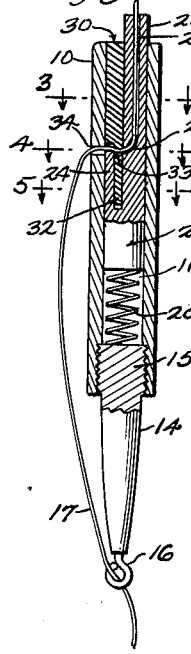
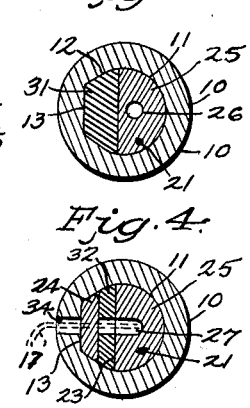
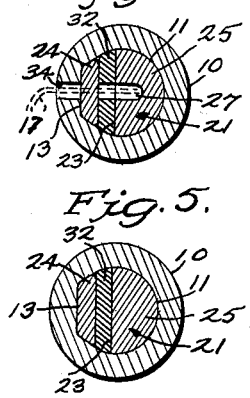
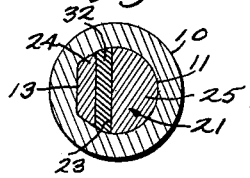
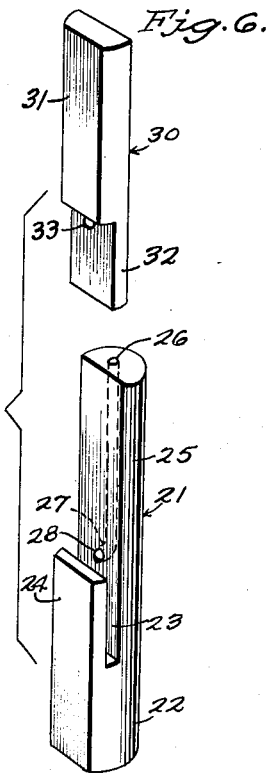
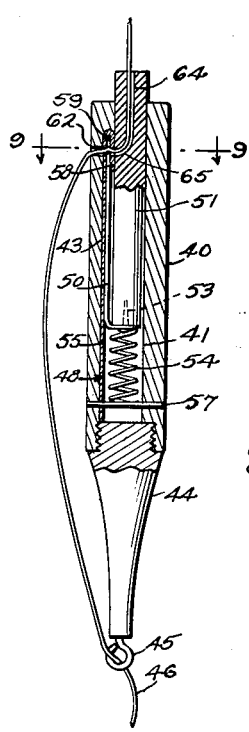
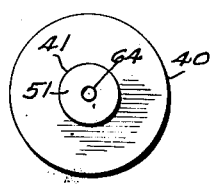
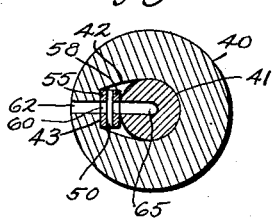
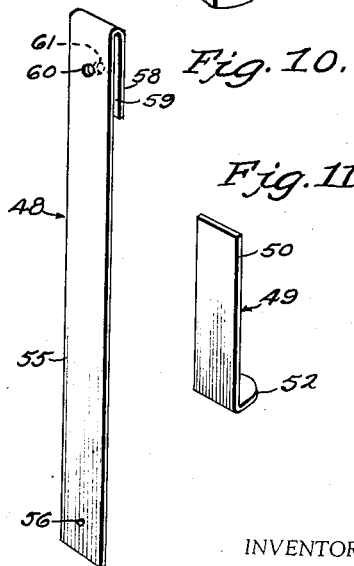
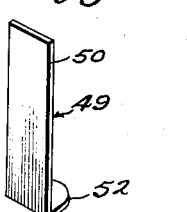
INVENTOR
JULIUS J. SCHUERMANN
BY Baldwin & Wright
HIS ATTORNEY Patented June 8, 1954

2,680,322

UNITED STATES PATENT OFFICE 2,680,322

FISHING BOB

Julius J. Schuermann, Sturgis, Mich., assignor of one-half to Johanna McKinney, Sturgis, Mich.

Application August 6, 1952, Serial No. 302,894

9 Claims. (Cl. 43—44.95)

This invention relates to fishing bobs.

An important object of the invention is to provide a novel type of fishing bob comprising a minimum number of highly simplified parts, and wherein the fishing line extending through the device may be readily adjusted along the line by the simple expedient of pressing a single spring-biased element.

A further object is to provide such a device wherein the body of the device is provided with a bore in which is arranged an element spring pressed to one direction to grip the line and hold the bob in position thereon, and wherein the gripping of the line is readily releasable by pressing a projecting end of the spring-pressed element, such element being engageable with the tip of a fishing pole when the line is reeled in to release the pressure on the line so that the hook end may be readily pulled up into proximity to the pole tip.

A further object is to provide such a device wherein portions of the body, or elements carried thereby, and a portion of the spring-pressed element, or a member carried thereby, are relatively slidable in overlapping relationship to each other to effect a line gripping action, and wherein the line easily may be threaded through the device.

Other objects and advantages of the invention will become apparent during the course of the following description.

In the drawing I have shown two embodiments of the invention. In this showing:

Figure 1 is a perspective view of one type of fishing bob;

Figure 2 is an enlarged axial sectional view through the same, showing a line threaded through the device, a portion being shown complete;

Figure 3 is an enlarged detail section on line 3—3 of Figure 2;

Figure 4 is a similar view on line 4—4 of Figure 2;

Figure 5 is a similar view on line 5—5 of Figure 2;

Figure 6 is an enlarged detail perspective view of the two main operating elements of the device shown disconnected;

Figure 7 is a sectional view similar to Figure 2, showing a modified form of the invention;

Figure 8 is an end elevation of the embodiment of Fig. 7;

Figure 9 is a section on line 9—9 of Figure 7;

Figure 10 is an enlarged detail perspective view of one of the line gripping elements which is fixed to the body of the device of Fig. 7; and Figure 11 is a similar view of the other gripping element which is carried by the spring-pressed element.

Referring to Figures 1–6 inclusive, the numeral 10 designates the body of the fishing bob having a bore 11 the upper portion of which is non-circular, as at 12, and provided with a flat face 13. The lower end of the body is provided with a projecting stem 14 preferably threaded in the body, as at 15, and provided at its free end with an eye 16 through which extends the fishing line 17 the lower end of which is provided with the usual leader and hook (not shown).

The upper end of the stem 14 forms a spring seat engageable with the lower end of a compression spring 20 the upper end of which seats against a slidable member 21. This slidable member is shown in section in lines 4 and 5 and is shown in detail in the lower part of Figure 6, and comprises a solid lower body 22 slotted as at 23 to provide opposite portions 24 and 25 the latter of which projects through and beyond the top of the body 10, as shown in Figure 2. The inner faces of the portions 24 and 25 are flat, whereby the slot 23 forms a flat side recess for a purpose to be described. The portion 25 is provided with a line receiving opening 26 which extends straight down through the portion 25 and has its lower end turned inwardly, as at 27, to form a lateral opening 28 lying just aove the upper end of the portion 24.

The portion 24 of the member 21 forms one of a pair of gripping elements the other of which is indicated as a whole by the numeral 30. The gripping element 30 is stationary within the body 10, as will become apparent, and comprises an upper body portion 31 corresponding in cross sectional shape to the space within the out-of-round portion 12 of the bore 11 and the adjacent face of the arm, or portion 25, of the clamping member 21. The lower end of the clamping member 30 is reduced in thickness, as at 32, to form a downwardly projecting finger portion the opposite faces of which are flat and which is slidable in the recess 23. The finger portion 32 is provided with an opening 33 adapted to align with the opening 28, and a similarly aligned opening 34 is formed through the body 10, as shown in Figure 2. The line 17 extends downwardly through the opening 26, through the opening 28, and thence through openings 33 and 34 to project externally of the body 10, and the lower end of the line is threaded through the eye 16 and connected to the fish hook in the usual manner.

In the form of the invention shown in Figures 7-11 inclusive, the device comprises a body 40 having an internal bore 41 a substantial portion of the length of which is out of round, as at 42, to provide a flat wall 43 offset laterally from the bore for a purpose which will become apparent. A stem 44 is preferably threaded in the lower end of the body and is provided at its lower end with an eye 45 through which extends the fishing line 46.

Within the out-of-round portion 42 of the body 40 is arranged a pair of cooperating gripping elements indicated as a whole respectively by the numerals 48 and 49. The element 49 comprises a very thin metallic member having an elongated body 50 arranged along and slightly spaced from the side of an axially movable member 51. The lower end of the body 50 extends laterally, as at 52, to engage the bottom of the member 51 and is fixed thereto, as at 53, to move therewith. Thus, the element 49 is secured to and in effect may be considered a part of the member 51.

The gripping member 48 is formed preferably of the same material as the member 49 and comprises an elongated body 55 which lies against the flat surface 43 within the body, and apertured at its lower end, as at 56, to receive a pin 57 by which the member 48 is fixed to the body 40 against longitudinal movement with respect thereto. At its upper end, the body portion of the member 48 is provided with a reverse bend 58, to form a space 59 in which the upper end of the body 50 of the gripping member 49 is slidable. The space 59 preferably corresponds in thickness to the member 49 to snugly receive the upper end thereof. The body 55 and downturned end 58 are provided with aligned thread receiving openings 60 and 61, and these openings are in alignment with an opening 62 formed in the bore 40. As in the case of the member 21, the axially slidable member 51 is provided with a thread receiving opening 64 the lower end of which turns laterally, as at 65, to communicate with the openings 60, 61 and 62 for the passage therethrough of the line 46.

*Operation*

The operation of the form of the invention shown in Figures 1-6, inclusive, is as follows. The line is threaded through the device, as shown in Figures 1 and 2. The distance of the bob from the fish hook readily may be adjusted by slightly depressing the member 21 by pushing on the upper end of the arm 25 thereof. This releases any clamping pressure on the line so that the latter freely may be pulled through the device in either direction to lengthen or shorten the distance between the bob and hook.

The member 21 is pushed, in the manner described, against the tension of the spring 20. The member 21 is released, and the spring 20 urges the member 21 upwardly. This moves the upper end of the finger 24 slightly above the bottoms of the openings 33 and 34 to clamp the line 17 between such openings. The thickness of the arm 24 is equal to the thickness of the space between the arm 32 and the flat body surface 13, and the thickness of the line 17 overlying the upper end of the arm 24 prevents this arm from moving beyond the point at which it grips the line against the top edges of the openings 33 and 34. This provides an effective gripping action, so that the bob will be effectively held in its adjusted position on the line 17.

It will be apparent that the main elements of the device, including the parts 10, 14, 21, and 30, are formed of buoyant material, for example wood, and accordingly the bob will float on the top of the water in accordance with customary practice. When a fish is hooked and attempts to run away with the bait, the bob will tilt in the water, and the fisherman will start to reel in his line, the present device moving with the line until the upper end of the member 25 contacts the tip of the pole. The spring 20 need exert only very light upward pressure to effect the clamping action, and when the tip of the rod is engaged in the manner stated, a further pull on the line creates a sufficient downward reaction on the upper end of the arm 24 to release the gripping engagement with the line, so that the reeling in of the latter may be continued until the fish is brought into proximity with the eye 16. After the fish has been removed, the device may be readjusted by paying out the line to the desired extent, slightly depressing the upper end of the member 25, and pulling on the lower end of the line until the hook is the desired distance from the bob. The member 25 is then released, and the parts re-assume the previously described line gripping positions.

The operation of the form of the device shown in Figures 7-11 is substantially identical with that previously described and need not be referred to in detail. The upper end of the body 50 of the member 49 slides in the space 59, and the upper extremity of the member 50 effects its clamping action by forcing the line against the tops of the openings 60 and 61, the space 59 being of insufficient thickness to permit the line to double down around the opposite surfaces of the member 50 so that the gripping action is solely at the edges of the tops of the openings 60 and 61. The pin 57 forms a seat for the lower end of the spring 54, and the pin also serves to fix the member 48 in the body 40. The bob may be adjusted along the line by depressing the upper end of the member 51 to a slight extent to relieve the gripping action, whereupon either the upper or lower end of the line may be pulled to adjust the position of the bob along the line.

In each form of the invention there are provided openings in elements spaced from each other and fixed against longitudinal movement, between which elements projects another element or portion thereof which is subject to spring biasing in one direction to effect the clamping action against the tops of the openings and is manually movable in the other direction to release the clamping action. Each form of the device is simple to construct and assemble, and the curvature of the lower ends of the openings 26 (Figure 6) and 64 (Figure 7) facilitates the threading of the line through the device. In the modified form of the device, the elements 40, 44, and 51 are buoyant and their buoyancy is not overcome by the relatively light metal parts, and accordingly this form of the device readily floats on the top of the water, as in the form of the invention shown in Figures 1-6 inclusive.

The member 31 may be fixed within the body 10 by waterproof cement or by any other suitable means, and the movable parts are assembled by being inserted through the lower end of the body 10. In Figure 7, the member 48 is inserted into the lower end of the body, after which the unit comprising elements 49 and 51 is inserted, followed by the spring 54, and with the parts assembled, the pin 57 is pushed into position and the stem 44 threaded to the bottom of the device.

The parts of both devices obviously, therefore, may be readily assembled or disassembled.

The constructions shown for the purposes of illustration embody the invention in preferred forms, but it is intended that the disclosure be illustrative rather than definitive of the invention. The invention is defined in the claims.

I claim:

1. A fishing bob comprising a body having an opening in one end and having a line-receiving opening in one side thereof, a member slidable in said end opening and having a line-receiving opening therethrough, means for clamping said line between said line-receiving openings, said means comprising a pair of elements in overlapping relationship, one of said elements being carried by said body and the other by said member, and spring means urging said member and the element carried thereby in a line clamping direction.

2. A fishing bob comprising an elongated body having an axial bore opening through one end of said body, a member axially slidable in said bore and projecting from said end of said body, a spring biasing said member in a direction toward said end of said body, said member having an axial line-receiving opening extending from the end thereof to a point within said body and turned laterally to extend through the side of said member, and said body having a radial line-receiving opening for the passage of a line from said member, and means for clamping a line within said body between said line-receiving openings, said means comprising a pair of elements having adjacent contacting surfaces parallel to the axis of said body, one of said elements being carried by said body and the other by said member for sliding movement therewith.

3. A fishing bob comprising an elongated body having an axial bore opening through one end of said body, a member axially slidable in said bore and projecting from said end of said body, a spring biasing said member in a direction toward said end of said body, said member having an axial line-receiving opening extending from the end thereof to a point within said body and turned laterally to extend through the side of said member, and said body having a radial line-receiving opening for the passage of a line from said member, and means for clamping a line within said body between said line-receiving openings, said means comprising a pair of elements having adjacent contacting surfaces parallel to the axis of said body, one of said elements being carried by said body and the other by said member for sliding movement therewith, the element of said pair carried by said member being interposed between the other of said elements and said body, to be moved by said spring means in said direction at least as far as said line-receiving opening in said body, to clamp the line with respect thereto.

4. A fishing bob comprising an elongated body having an axial bore opening through one end of said body, a member axially slidable in said bore and projecting from said end of said body, a spring biasing member in a direction toward said end of said body, said member having an axial line-receiving opening extending from the end thereof to a point within said body and turned laterally to extend through the side of said member and said body having a radial line-receiving opening for the passage of a line from said member, and said body having a radial line-receiving body between said line-receiving openings, said means comprising a pair of elements having adjacent contacting surfaces parallel to the axis of said body, one of said elements being carried by said body and the other by said member for sliding movement therewith, the element of said pair which is carried by said body comprising a finger parallel to and spaced from one wall of said bore adjacent the line-receiving opening in said body and projecting from said opening in a direction opposite said first-named direction, the element of said pair carried by said member comprising a finger projecting in said first-named direction in the space between said body and said first-named finger and of a thickness substantially equal to the width of said space.

5. A fishing bob comprising an elongated body having an axial bore opening through one end of said body, a member axially slidable in said bore and projecting from said end of said body, a spring biasing said member in a direction toward said end of said body, said member having an axial line-receiving opening extending from the end thereof to a point within said body and turned laterally to extend through the side of said member, and said body having a radial line-receiving opening for the passage of a line from said member, means for clamping a line within said body between said line-receiving openings, said means comprising a pair of elements having adjacent contacting surfaces parallel to the axis of said body, one of said elements being carried by said body and the other by said member for sliding movement therewith, the element of said pair carried by said member being interposed between the other of said elements and said body, to be moved by said spring means in said direction at least as far as said line-receiving opening in said body, to clamp the line with respect thereto, a fixed member threaded in the other end of said body, said spring comprising a coil spring seating at opposite ends against said members, and a line-receiving eye carried by the end of said second-named member.

6. A fishing bob comprising an elongated body having an axial bore opening through one end of said body, a member axially slidable in said bore and projecting from said end of said body, a spring biasing said member in a direction toward said end of said body, said member having an axial line-receiving opening extending from the end thereof to a point within said body and turned laterally to extend through the side of said member, and said body having a radial line-receiving opening for the passage of a line from said member, means for clamping a line within said body between said line-receiving openings, said means comprising a pair of elements having adjacent contacting surfaces parallel to the axis of said body, one of said elements being carried by said body and the other by said member for sliding movement therewith, the element of said pair which is carried by said body comprising a finger parallel to and spaced from one wall of said bore adjacent the line-receiving opening in said body and projecting from said opening in a direction opposite said first-named direction, the element of said pair carried by said member comprising a finger projecting in said first-named direction in the space between said body and said first-named finger and of a thickness substantially equal to the width of said space, a fixed member threaded in the other end of said body, said spring comprising a coil spring seating at opposite ends against said members, and a line-receiving eye carried by the end of said second-named member.

7. A fishing bob comprising a buoyant body having a bore extending throughout the greater portion of the length thereof and opening through one end of said body, a substantial length of said bore at said end of said body being non-circular and providing a flat face parallel to the axis of said body, a member slidable in said end of said body and projecting longitudinally from such end, said member at the inner end thereof being longitudinally slotted and outwardly of such slot having a finger provided with a flat face slidable against said flat face of said bore, an element arranged in said end of said body and having a finger projecting in the opposite direction from said first-named finger and arranged slidably within the slot in said member, said member having a line-receiving opening extending longitudinally from the projecting portion thereof and having an inner end turned laterally, said second-named finger and said body having line-receiving openings through which projects a line from the line-receiving opening of said member, and spring means urging said member in said direction whereby said first-named finger moves across the line-receiving openings of said body and said second-named finger to bind the line in such openings.

8. A fishing bob comprising a buoyant body having a bore extending throughout the greater portion of the length thereof and opening through one end of said body, a substantial length of said bore at said end of said body being non-circular and providing a flat face parallel to the axis of said body, a member slidable in said end of said body and projecting longitudinally from such end, said member at the inner end thereof being longitudinally slotted and outwardly of such slot having a finger provided with a flat face slidable against said flat face of said bore, an element arranged in said end of said body and having a finger projecting in the opposite direction from said first-named finger and arranged slidably within the slot in said member, said member having a line-receiving opening extending longitudinally from the projecting portion thereof and having an inner end turned laterally, said second-named finger and said body having line-receiving openings through which projects a line from the line-receiving opening of said member, spring means urging said member in said direction whereby said first-named finger moves across the line-receiving openings of said body and said second-named finger to bind the line in such openings, a second member fixed to and projecting from the opposite end of said body, said spring means comprising a coil spring seating at its ends against said members, and a line-receiving eye carried by the end of said second-named member.

9. A fishing bob comprising an elongated body having a bore therein opening through one end of said body, a member slidable in said bore and projecting from said end of said body, spring means urging said member in a direction toward said end of said body, said member having a longitudinal line-receiving opening extending through the projecting end thereof and terminating at its inner end in a laterally projecting opening and said body having a radial opening aligning with the inner end of said first-named opening when said member is in a predetermined position relative to said body, and means for clamping a line in said body between said line-receiving openings, said means comprising a clamping member fixed at one end to said body within said bore and having a reverse bend forming to form a longitudinal lip, and such lip and the body portion of said clamping member having openings aligned with each other and with the line-receiving opening of said body, and a second clamping member fixed to said slidable member and projecting into the space between said lip and the body portion of said first-named clamping member to bind a line with respect to the openings therethrough under the influence of pressure exerted by said spring means.

References Cited in the file of this patent

UNITED STATES PATENTS

| Number | Name | Date |
| --- | --- | --- |
| 1,371,170 | Johnson | Mar. 8, 1921 |
| 2,302,549 | Hodges | Nov. 17, 1942 |

FOREIGN PATENTS

| Number | Country | Date |
| --- | --- | --- |
| 11,318 | Great Britain | A. D. 1911 |